US012515839B1

(12) United States Patent
Shih et al.

(10) Patent No.: US 12,515,839 B1
(45) Date of Patent: Jan. 6, 2026

(54) BOTTLE DISCHARGING AND DELIVERING EQUIPMENT OF COUNTING MACHINE

(71) Applicant: CVC TECHNOLOGIES INC., Taichung (TW)

(72) Inventors: Chi-Huan Shih, Taichung (TW); Chang-Cheng Chen, Taichung (TW); Jian-Bin Zhang, Taichung (TW); Hsiao-Ting Wang, Taichung (TW)

(73) Assignee: CVC TECHNOLOGIES INC., Taichung (TW)

( * ) Notice: Subject to any disclaimer, the term of this patent is extended or adjusted under 35 U.S.C. 154(b) by 0 days.

(21) Appl. No.: 18/764,725

(22) Filed: Jul. 5, 2024

(51) Int. Cl.
*B65B 57/20* (2006.01)
*B07C 5/34* (2006.01)
*B65G 41/00* (2006.01)

(52) U.S. Cl.
CPC ............ *B65B 57/20* (2013.01); *B65G 41/002* (2013.01); *B07C 5/3404* (2013.01); *B65G 2201/0244* (2013.01)

(58) Field of Classification Search
CPC .. B65G 41/002; B65G 41/005; B65G 41/007; B65G 21/10; B65G 21/14; B65G 47/644–648; B65G 47/519; B65B 57/20; B07C 5/3404; B07C 5/3408
USPC ....................................................... 53/53, 54
See application file for complete search history.

(56) References Cited

U.S. PATENT DOCUMENTS

| 2,959,269 | A | * | 11/1960 | Kammerer | B65G 47/648 198/437 |
| 4,691,496 | A | * | 9/1987 | Anderson | B65B 57/10 53/64 |
| 4,915,237 | A | * | 4/1990 | Chang | B07C 5/3408 198/406 |
| 4,925,036 | A | * | 5/1990 | Sumi | B07C 5/362 209/552 |
| 5,078,255 | A | * | 1/1992 | Haley | B65G 47/647 198/369.2 |
| 5,505,312 | A | * | 4/1996 | Haring | B08B 9/46 209/939 |
| 5,613,591 | A | * | 3/1997 | Heit | B65G 47/844 198/370.02 |
| 8,851,266 | B2 | * | 10/2014 | Liu | B65G 47/647 198/367.1 |
| 10,759,643 | B2 | * | 9/2020 | Soellner | B65B 55/027 |

(Continued)

FOREIGN PATENT DOCUMENTS

CN 205150377 U 4/2016
DE 3116150 A1 * 11/1982 ............. B65B 57/00
(Continued)

*Primary Examiner* — Joshua G Kotis
(74) *Attorney, Agent, or Firm* — WPAT, PC

(57) ABSTRACT

A bottle discharging and delivering equipment of counting machine includes a delivery belt and a collection bin under the delivery belt. The delivery belt has a feeding end and an outputting end. The feeding end has a fixed part for receiving a bottle, and the outputting end has a swinging part connected with the fixed part. When the bottle filled with objects is detected to be unqualified, the swinging part of the delivery belt swings downward to discharge the unqualified bottle into the collection bin from the delivery belt. When the bottle is detected to be qualified, the bottle is outputted from the outputting end.

8 Claims, 10 Drawing Sheets

(56) References Cited

U.S. PATENT DOCUMENTS

| | | | |
|---|---|---|---|
| 2003/0010682 A1* | 1/2003 | Linton | B07C 5/3408 |
| | | | 209/524 |
| 2006/0271237 A1* | 11/2006 | Kim | B65B 57/10 |
| | | | 700/226 |
| 2007/0151831 A1* | 7/2007 | Le Borgne | B65G 21/12 |
| | | | 198/860.1 |
| 2011/0180371 A1* | 7/2011 | Carrara | B65G 47/647 |
| | | | 198/435 |
| 2013/0199127 A1* | 8/2013 | Forestelli | B65B 57/00 |
| | | | 356/402 |
| 2014/0249767 A1* | 9/2014 | Thomas | G01G 15/006 |
| | | | 702/82 |
| 2014/0332342 A1* | 11/2014 | Guernsey | B65G 47/844 |
| | | | 198/370.07 |
| 2017/0203927 A1* | 7/2017 | Philipp | B65B 35/24 |
| 2018/0016100 A1* | 1/2018 | Axmann | B65G 13/11 |
| 2018/0264521 A1* | 9/2018 | Chapelet | B07C 5/04 |
| 2018/0273308 A1* | 9/2018 | Schroeder | B65G 43/08 |
| 2019/0154599 A1* | 5/2019 | Kaminski | G01N 23/18 |
| 2020/0399074 A1* | 12/2020 | Heim | B65B 57/14 |
| 2021/0025831 A1* | 1/2021 | Shih | G01N 21/90 |
| 2022/0001423 A1* | 1/2022 | Fuhrmann | B07C 5/02 |
| 2022/0194716 A1* | 6/2022 | Düppre | B65G 47/682 |
| 2022/0411194 A1* | 12/2022 | Mueller | B65G 47/647 |
| 2024/0059501 A1* | 2/2024 | Cerny | G01N 21/9036 |

FOREIGN PATENT DOCUMENTS

| | | | | |
|---|---|---|---|---|
| EP | 0897760 A1 | * | 2/1999 | B65G 47/2445 |
| JP | H1111629 A | * | 1/1999 | B65G 21/14 |
| JP | 2002263588 A | * | 9/2002 | B07C 5/36 |

\* cited by examiner

BOTTLE DISCHARGING AND DELIVERING EQUIPMENT OF COUNTING MACHINE

BACKGROUND OF THE INVENTION

1. Field of the Invention

The present invention relates to delivering equipment, and more particularly, to a bottle discharging and delivering equipment of counting machine.

2. Description of the Related Art

Chinese utility model patent CN205150377U disclosed a "Continuous Modularized Counting Machine", which is used for counting pellet objects such as drugs and capsules and filling them into bottles. The counting machine comprises a bottle conveying mechanism, which is a conveyor belt located at the front of the counting machine and arranged in a linear manner. The bottle conveying mechanism is configured to receive empty bottles and deliver those empty bottles to the counting machine for filling with pellet objects therein, and the bottles are delivered to the next process after being filled.

The counting machine further comprises a rejecting mechanism disposed along the direction of the conveyor belt as the counting machine. The rejecting mechanism receives instructions from the control system to reject defective products (such as those having insufficient or excessive filling quantity), so as to prevent the defective products from entering the next workstation.

The conveyor belt of said counting machine delivers bottles in a linear manner, which results in a longer overall length requirement and is thereby unable to save space. Also, after the bottles are filled with pellet objects, the defective bottles are sent to the corresponding position of the rejecting mechanism and then undergo the rejecting process. Such arrangement imposes negative effects on the bottle delivery efficiency and fails to facilitate the improvement of the overall operational efficiency. Moreover, existence of excessive or complex mechanisms may cause the jam of bottles during operation.

SUMMARY OF THE INVENTION

To improve the issues above, the present invention discloses a bottle discharging and delivering equipment of counting machine. With the delivery belt swinging downward to discharge the unqualified bottles, the operational efficiency of the bottle discharging process is enhanced.

For achieving the aforementioned objectives, an embodiment of the present invention provides a bottle discharging and delivering equipment of counting machine, comprising:

a bottle discharging device having a delivery belt and a collection bin located below the delivery belt, the delivery belt comprising a feeding end and an outputting end, the feeding end having a fixed part for receiving bottles, the outputting end having a swinging part connected with the fixed part, the swinging part being swingable between a bottle delivering position and a bottle discharging position with respect to the fixed part; when the bottle filled with objects is detected to be unqualified, the swinging part swings with respect to the fixed part, such that the unqualified bottle is discharged into the collection bin from the delivery belt; when the bottle is detected to be qualified, the bottle is outputted from the outputting end.

With such configuration, the delivery belt of the bottle discharging device swings downward to discharge the unqualified bottle, so as to reduce the issue of bottle jam due to operation of excessive mechanism, and prevent the production quality from being affected by personnel retrieving and placing bottles on the bottle discharging device.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion. Also, to enhance readability, certain parts constituting components are omitted in some drawings, or depicted using other methods such as imaginary lines.

Figure 7:
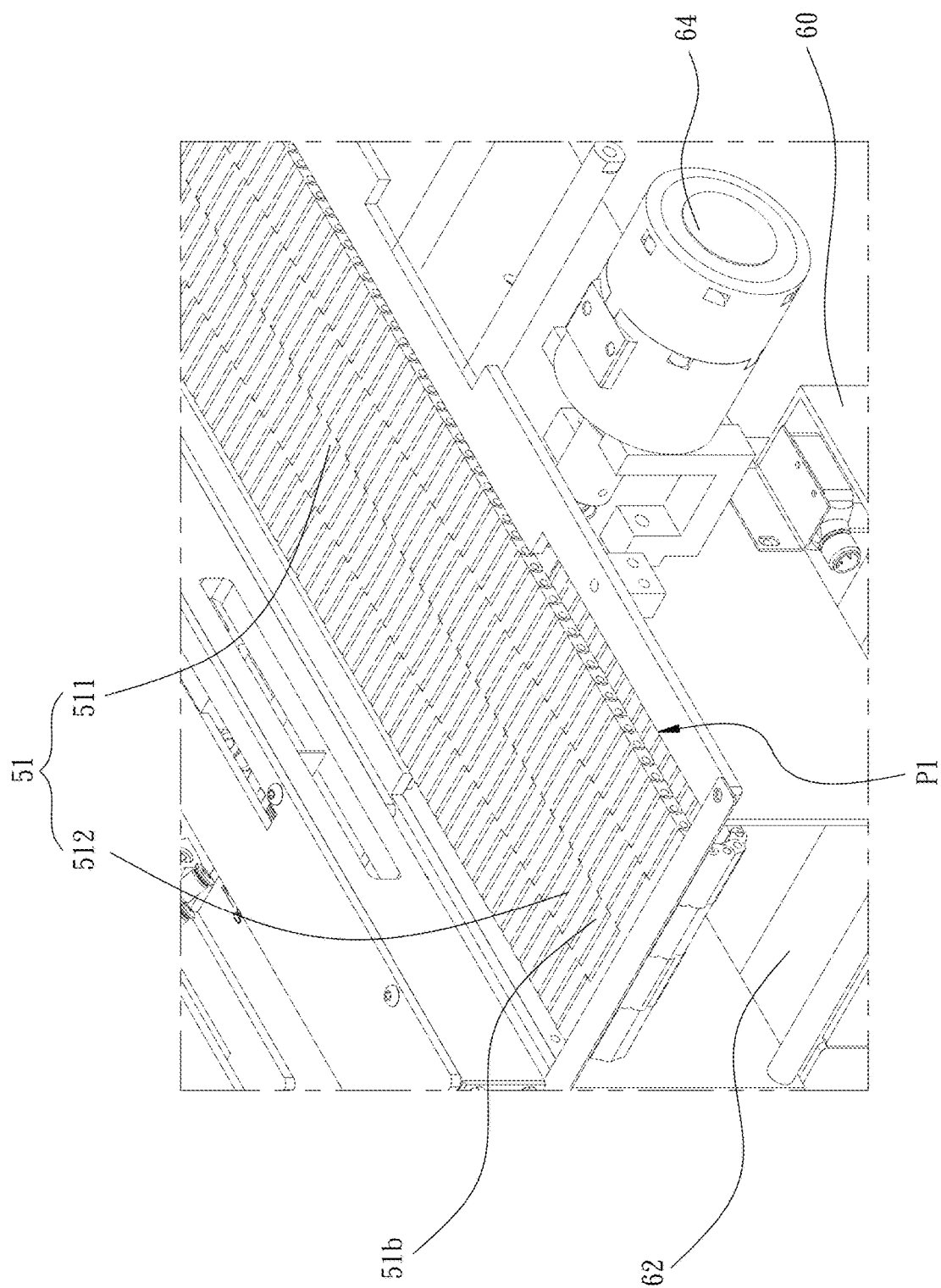
FIG. 7 is a partially enlarged schematic view of the first delivering belt of the bottle discharging device, illustrating the swinging part at the bottle delivering position.
Figure 8:
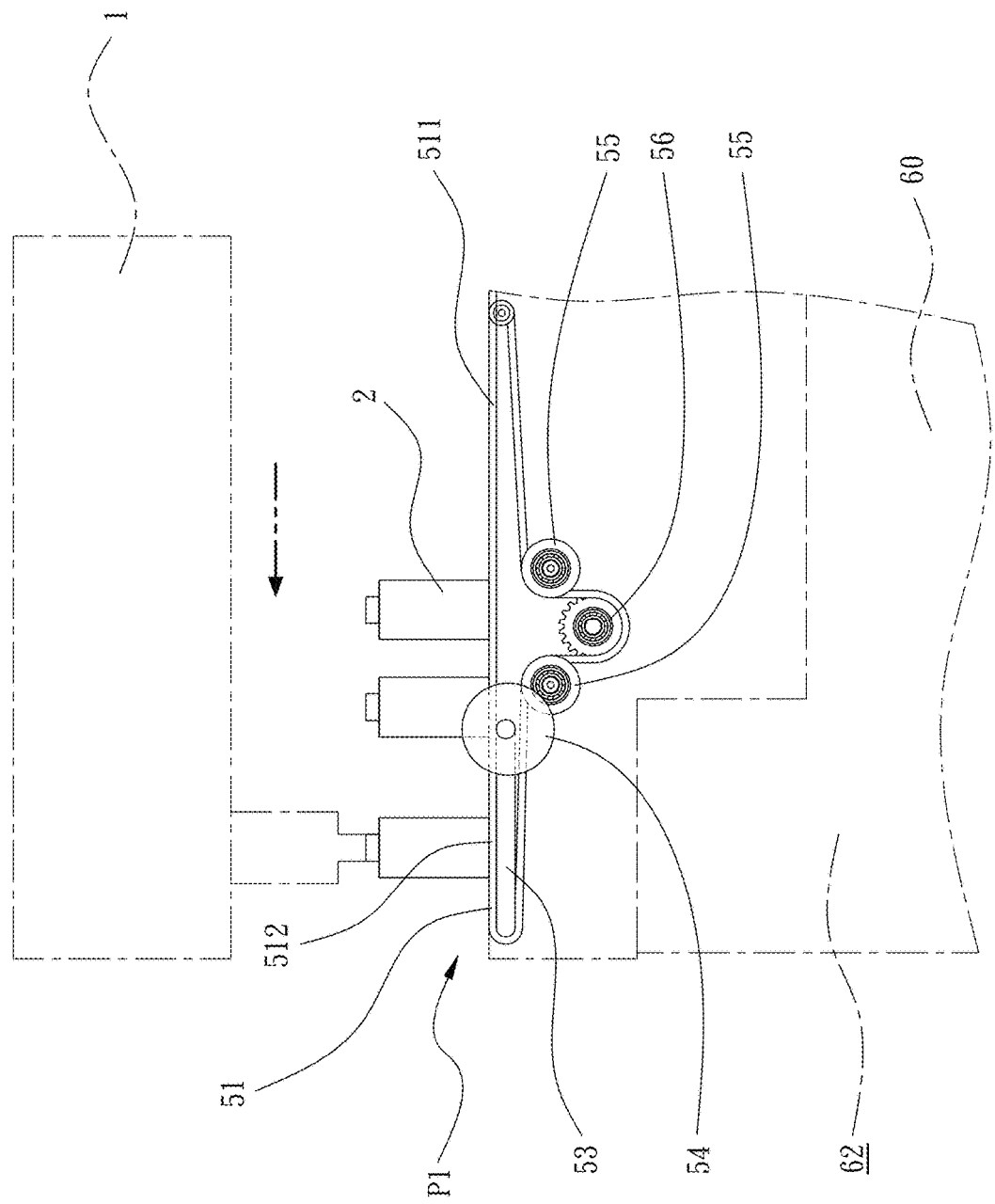
FIG. 8 is a structural schematic view of the first delivering belt and the inner side thereof, illustrating the counting machine filling objects in the first bottle.
Figure 9:
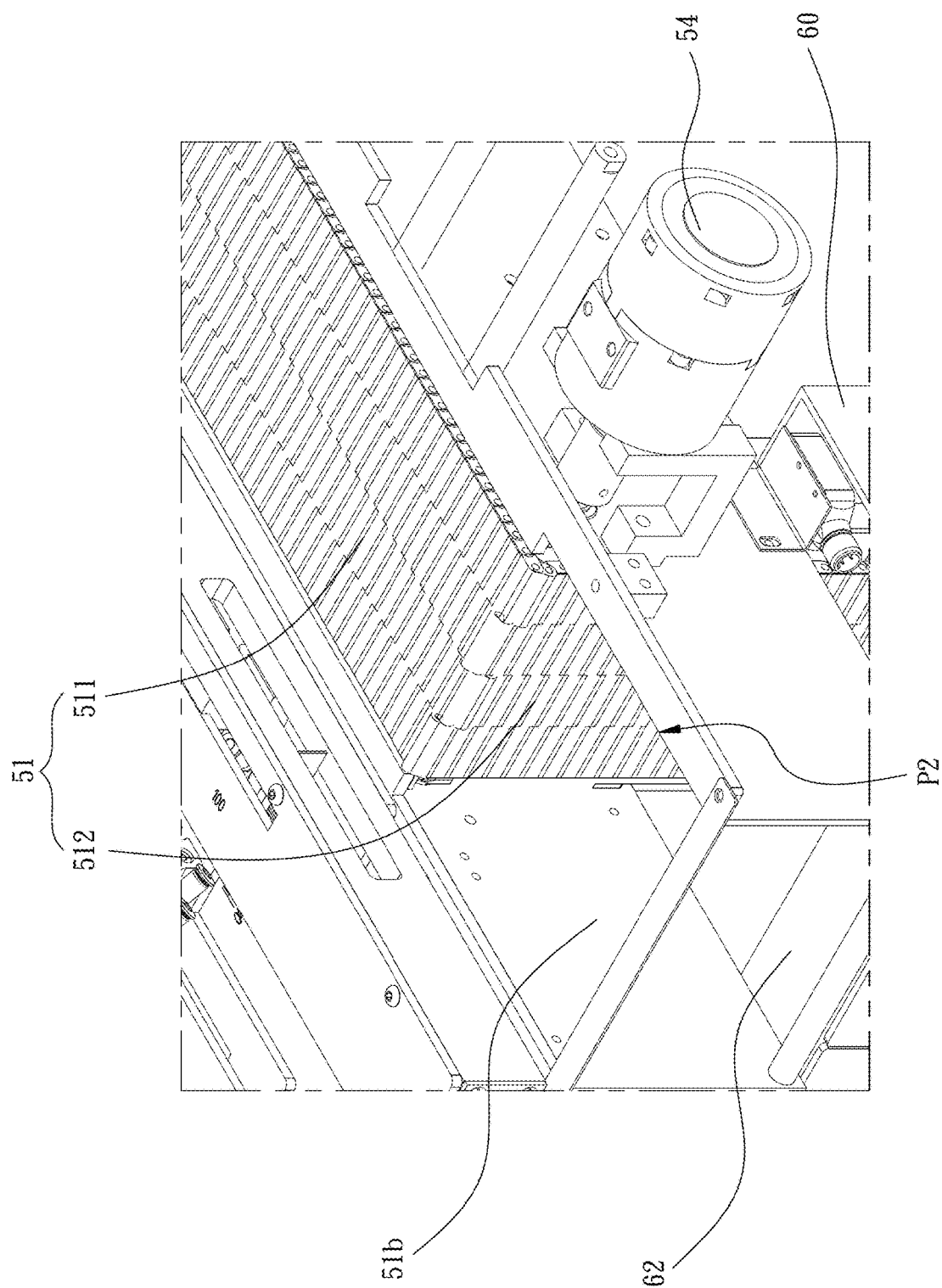
FIG. 9 is a partially enlarged view of the first delivering belt of the bottle discharging device, illustrating the swinging part at the bottle discharging position.

Referring to FIG. 1 to FIG. 10, the present invention provides a bottle discharging and delivering equipment of counting machine, comprising a conveyor device 100 and a bottle discharging device 200. The conveyor device 100 is used to hold empty bottles and convey the empty bottles to the bottle discharging device 200 for a counting machine 1 arranged above the bottle discharging device 200 (as shown by FIG. 8) to fill pellet objects (such as medicine tablets and capsules) into the bottles, after which the filled up bottles are sent to the next process. Therein, when a detection unit in the counting machine 1 determines that the bottles are overfilled or underfilled (deemed as unqualified), the bottle discharging device 200 discards those unqualified bottles, preventing them from being subsequently sent to the next process. The counting machine 1 and its detection unit are not the focus of the present invention, so that the relative description are omitted.

Figure 3:
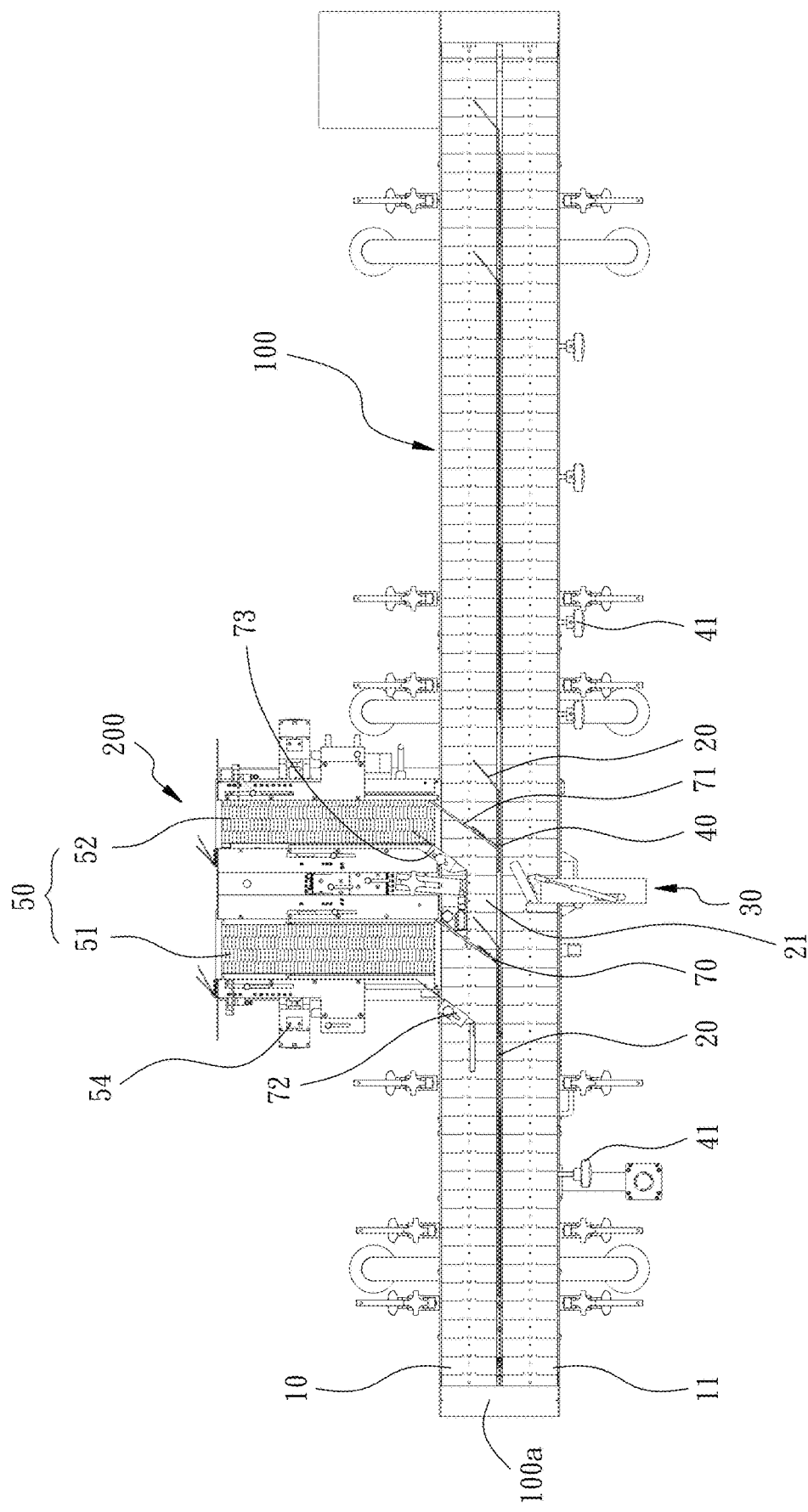
FIG. 3 is a top view of the bottle discharging and delivering equipment of counting machine in accordance with an embodiment of the present invention.
Figure 5:
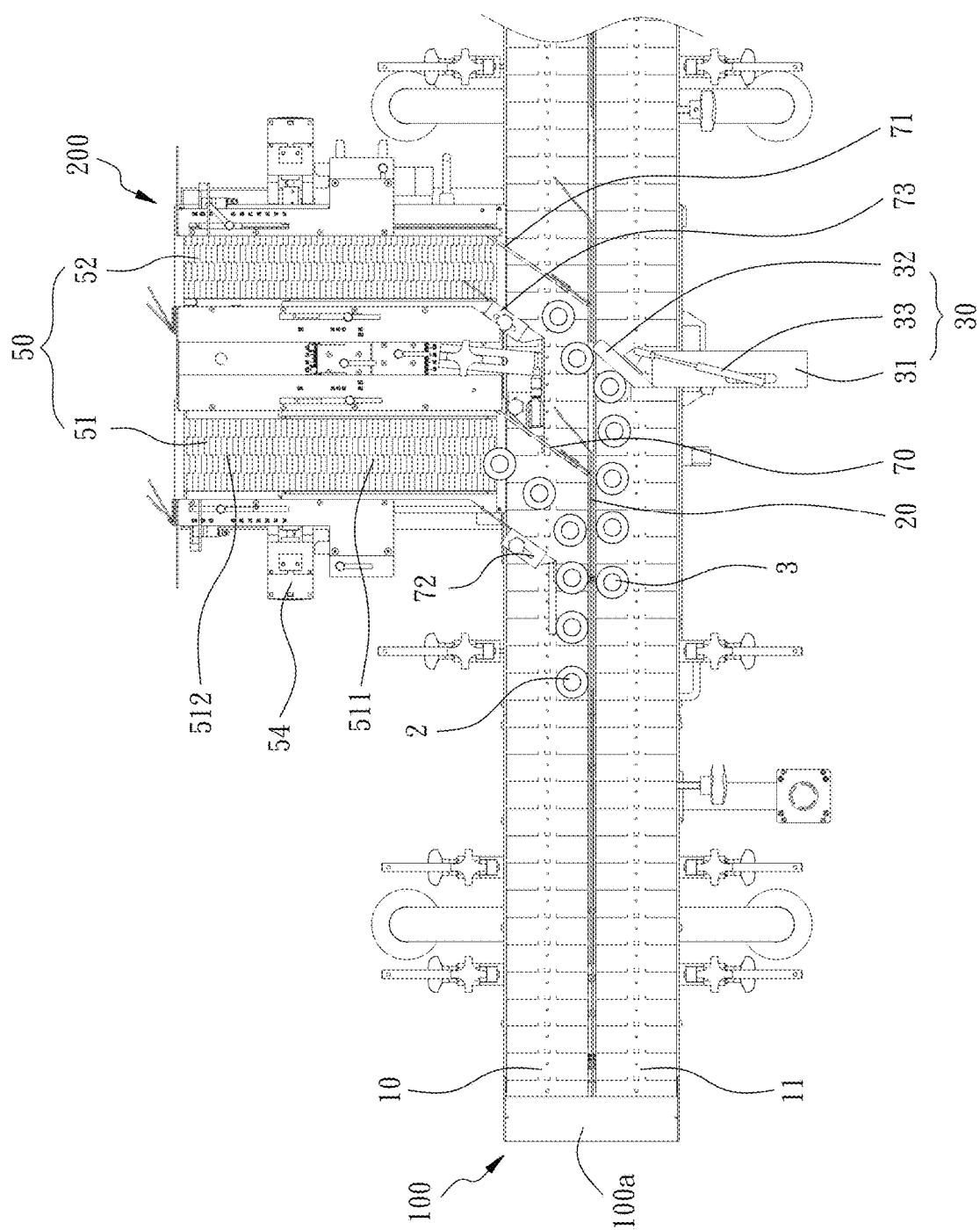
FIG. 5 is a sectional view illustrating the first and second conveyor belts conveying the first bottle and the second bottle to the first and second delivering belts of the bottle discharging device.
Figure 6:
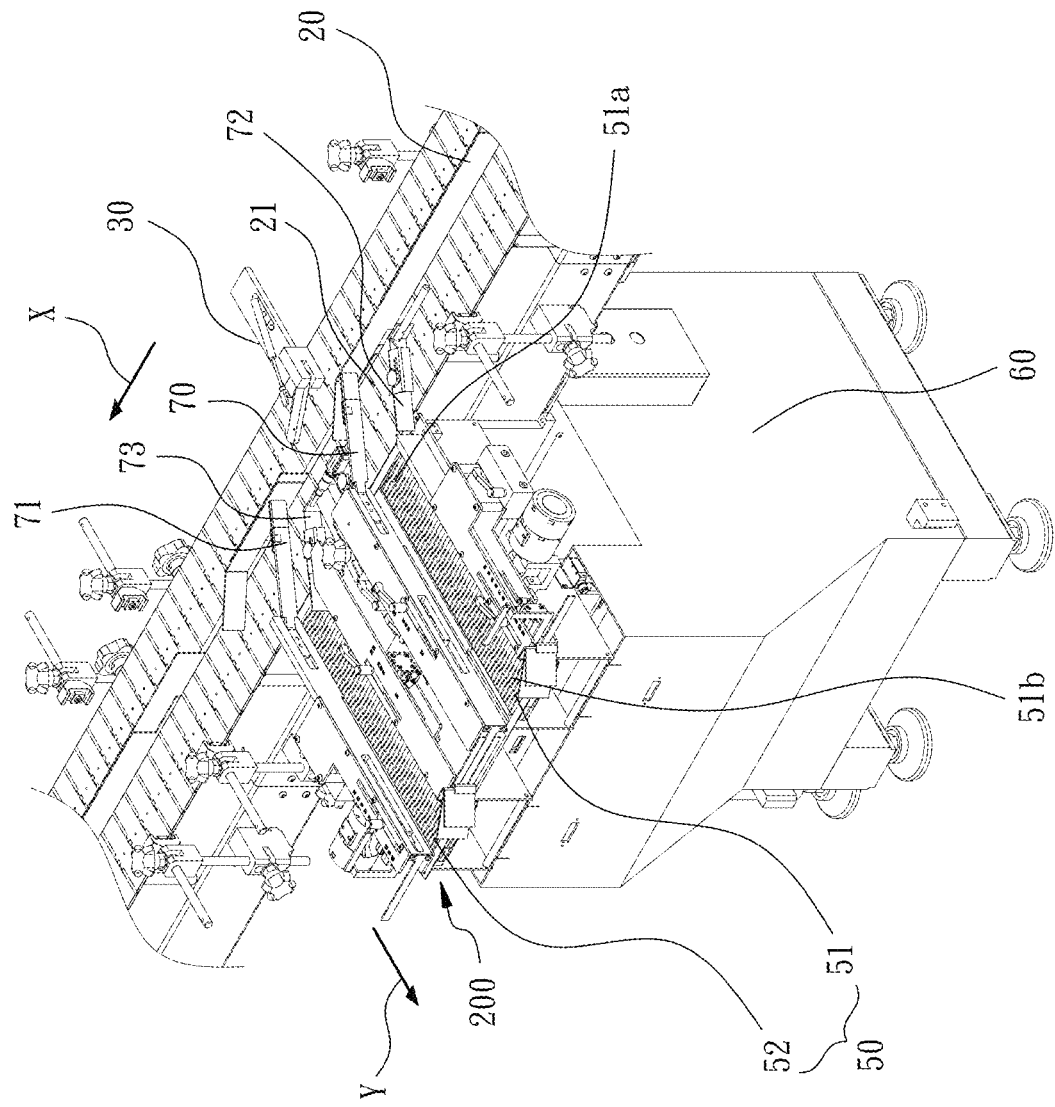
FIG. 6 is a perspective view of the bottle discharging device in accordance with an embodiment of the present invention.

The conveyor device 100 is disposed along a first direction X for conveying bottles. Referring to FIG. 5, in the embodiment, the bottles includes a first bottle 2 and a second bottle 3. Referring to FIG. 3, the conveyor device 100 comprises a first conveyor 10 and a second conveyor 11 disposed in parallel arrangement, a plurality of movable fences 20, and an allocation unit 30. Therein, the conveyor device 100 includes a bottle feeding end 100a, with a channel 21 arranged between each two neighboring movable fences 20.

The movable fences 20 are orderly disposed between the first conveyor 10 and the second conveyor 11 along the first direction X. The first conveyor 10 is used to convey the first bottle 2, which is guided to the bottle discharging device 200 by one of the movable fences 20 (as shown by FIG. 5 and arranged near the bottle feeding end 100a). The second conveyor 11 is used to convey the second bottle 3, which is guided to the bottle discharging device 200 by another movable fence 20 (as shown by FIG. 5 and arranged away from the bottle feeding end 100a) and the allocation unit 30, achieving a dual-track diversion function.

Figure 4:
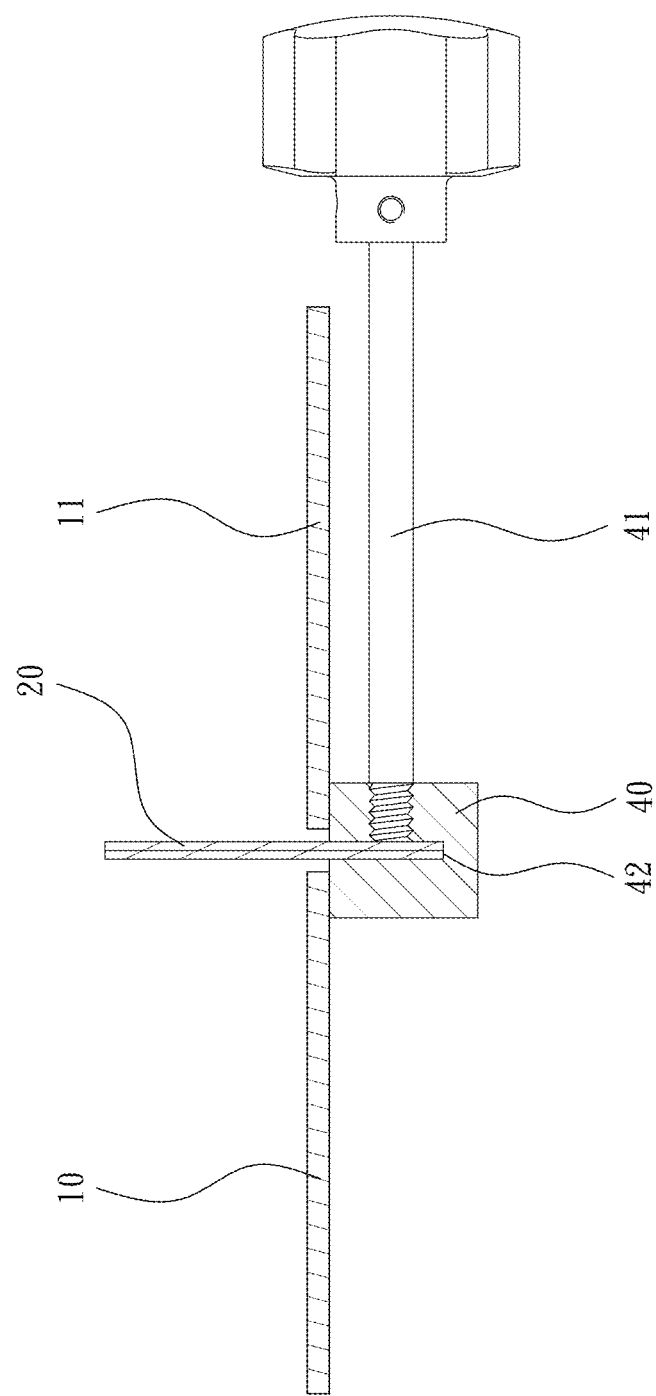
FIG. 4 is a structural schematic view illustrating the position limiting member pressing the movable fence to the rail seat.

Referring to FIG. 3 and FIG. 4, the conveyor device 100 further comprises a rail seat 40 and a plurality of position limiting members 41. The rail seat 40 is disposed between the first conveyor 10 and the second conveyor 11. The rail seat 40 comprises a slide groove 42, in which the movable fences 20 are slidably disposed therein. The position limiting members 41 rotatably penetrate the rail seat 40, respectively, and optionally abut against the corresponding movable fences 20. Therefore, when the position limiting member 41 is rotated to be loosened, the movable fence 20 is allowed to be adjust with respect to the rail seat 40, so as to be adjusted to the predetermined position and then pressed by the position limiting member 41 to be positioned. Thus, the position of the movable fence 20 and the size of the channel 21 are adjustable according to the design of the production line.

Referring to FIG. 5, the allocation unit 30 comprises a fixed seat 31, an allocating member 32, and a driving cylinder 33. The fixed seat 31 is disposed on one side of the second conveyor 11. The allocating member 32 pivotally disposed on the front end of the fixed seat 31. The driving cylinder 33 is connected with the allocating member 32 for driving the allocating member 32 to sway with respect to the second conveyor 11, so as to force the second bottle 3 to pass through the channel 21 from the second conveyor 11 to be conveyed to the bottle discharging device 200

The bottle discharging device 200 is disposed on one side of the conveyor device 100. The bottle discharging device 200 comprises a delivery belt 50 and a collection bin 60 disposed below the delivery belt 50. The delivery belt 50 is disposed along a second direction Y perpendicular to the first direction X. The delivery belt 50 includes a first delivering belt 51 and a second delivering belt 52 disposed in parallel arrangement. The first delivering belt 51 is used to receive the first bottle 2 from the first conveyor 10, and the second delivering belt 52 is used to receive the second bottle 3 from the second conveyor 11.

In the embodiment, a tilted first stopper 70 is disposed on the first delivering belt 51 in adjacent to the first conveyor 10, so as to keep the first bottle 2 to be conveyed to the first delivering belt 51; a tilted second stopper 71 is disposed on the second delivering belt 52 in adjacent to the first conveyor 10, so as to keep the second bottle 3 to be conveyed to the second delivering belt 52. Further, in the embodiment, a first guide plate 72 is disposed on one side of the first delivering belt 51 corresponding to the first stopper 70, and a second guide plate 73 is disposed on one side of the second delivering belt 52 corresponding to the second stopper 71. Therefore, the first bottle 2 from the first conveyor 10 is guided by the movable fence 20, the first stopper 70, and the first guide plate 72 toward the first delivering belt 51; the second bottle 3 from the second conveyor 11 is guided by the movable fence 20, the allocation unit 30, the second stopper 71, and the second guide plate 73 to pass through the channel 21 to move to the second delivering belt 52.

Figure 10:
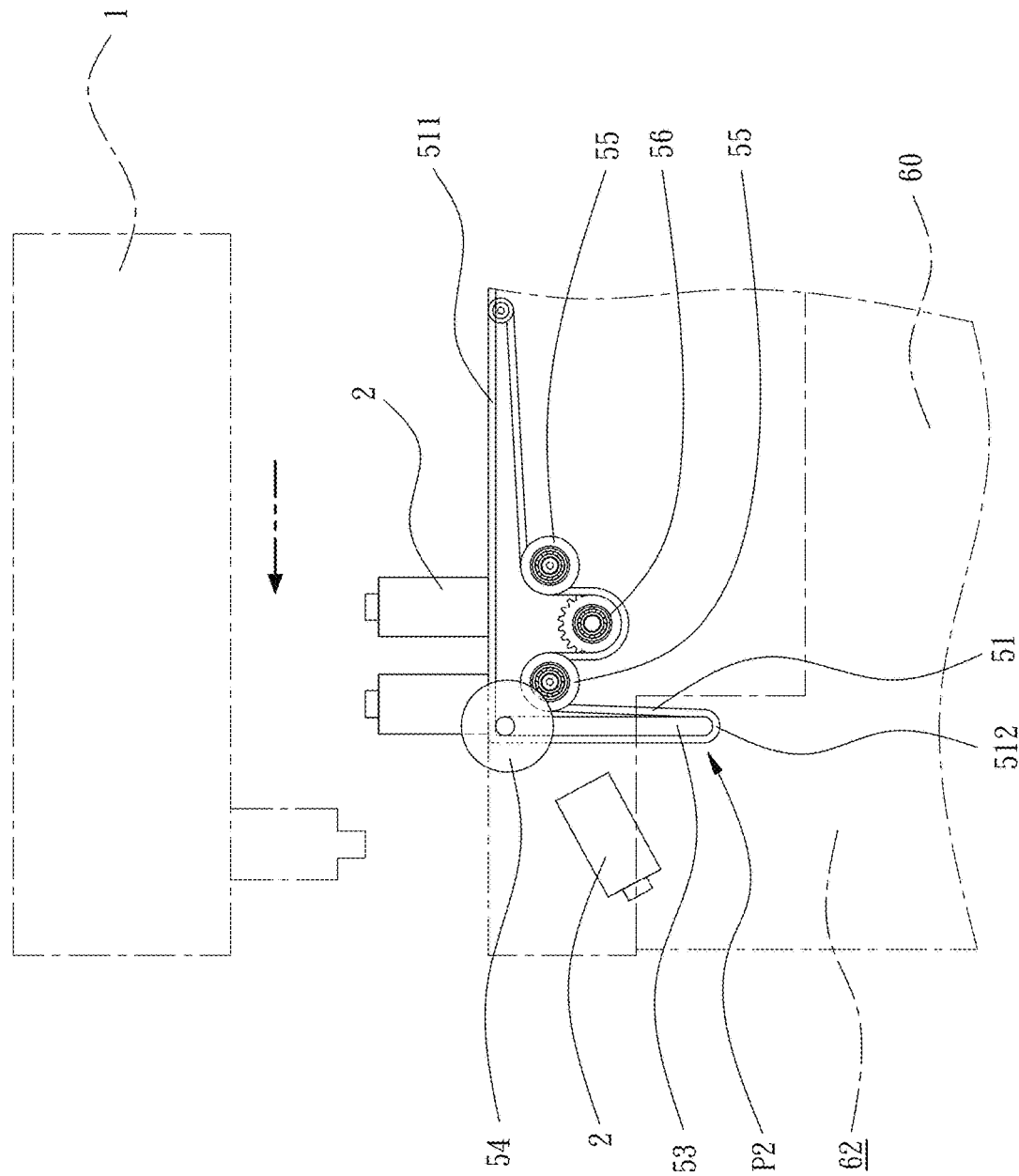
FIG. 10 is a schematic view of the bottle discharging motion of the first delivering belt, illustrating the unqualified first bottle falling to the collection bin.

Referring to FIG. 6 to FIG. 10, for illustrative purposes, only the operation principle of the first delivering belt 51 is presented in the present invention. It should be understood that the operating principle of the second delivering belt 52 is the same as that of the first delivering belt 51 and thus is not described again. The first delivering belt 51 comprises a feeding end 51a and an outputting end 51b. The feeding end 51a comprises a fixed part 511 neighboring the conveyor device 100 for receiving the first bottle 2. The outputting end 51b comprises a swinging part 512 connected with the fixed part 511. The swinging part 512 is allowed to swing between a bottle delivering position P1 (as shown by FIG. 8) and a bottle discharging position P2 (as shown by FIG. 10) with respect to the fixed part 511.

Referring to FIG. 8 and FIG. 10, the inner sides of the first delivering belt 51 and the second delivering belt 52 of the bottle discharging device 200 further comprise a swinging seat 53, a driving member 54, two rollers 55, and a tension wheel 56, respectively. The swinging seat 53 is disposed on the inner side of the swinging part 512 to be wrapped around by one end of the first delivering belt 51. The driving member 54 is a swing clamp cylinder connected to one end of the swinging seat 53 for driving the swinging seat 53, so that the swinging part 512 swings downward. The two rollers 55 are disposed on one side of the swinging seat 53, with the tension wheel 56 disposed between the two rollers 55. The first delivering belt 51 wraps around the two rollers 55 and the tension wheel 56.

With such configuration, when the first bottle 2 is conveyed to the swinging part 512 of the first delivering belt 51 for the counting machine 1 above to fill pellet objects thereinto, if the detection unit in the counting machine 1 determines that the first bottle 2 is overfilled or underfilled, the driving member 54 drives the swinging seat 53 to operate, such that the swinging part 512 swings downward from the bottle delivering position P1 to the bottle discharging position P2, whereby the unqualified first bottle 2 is discharged into the collection bin 60. Therefore, unqualified bottles are excluded and recycled, preventing unqualified first bottles 2 from being delivered to the next process.

Figure 1:
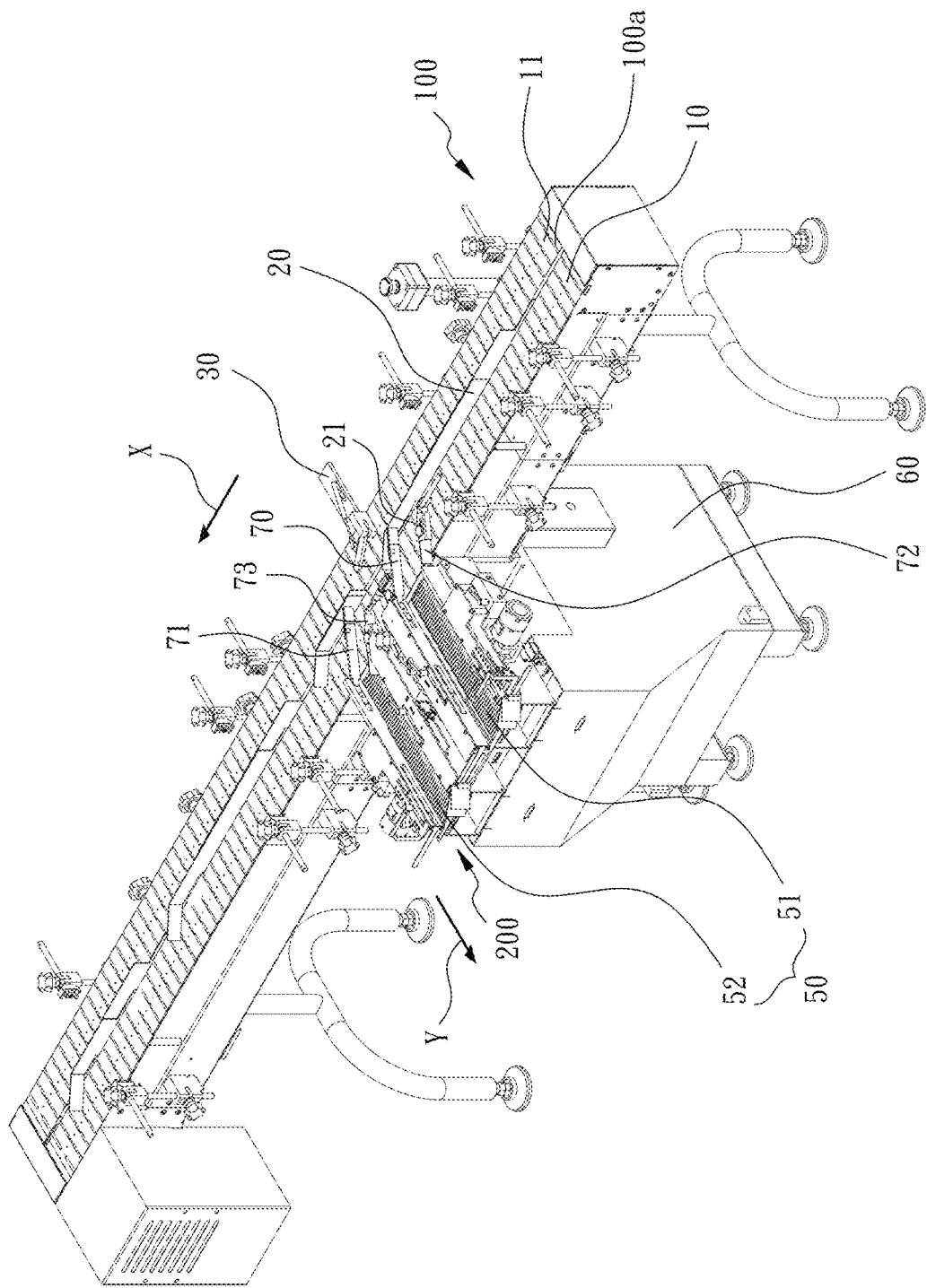
FIG. 1 is a perspective view of the bottle discharging and delivering equipment of counting machine in accordance with an embodiment of the present invention.
Figure 2:
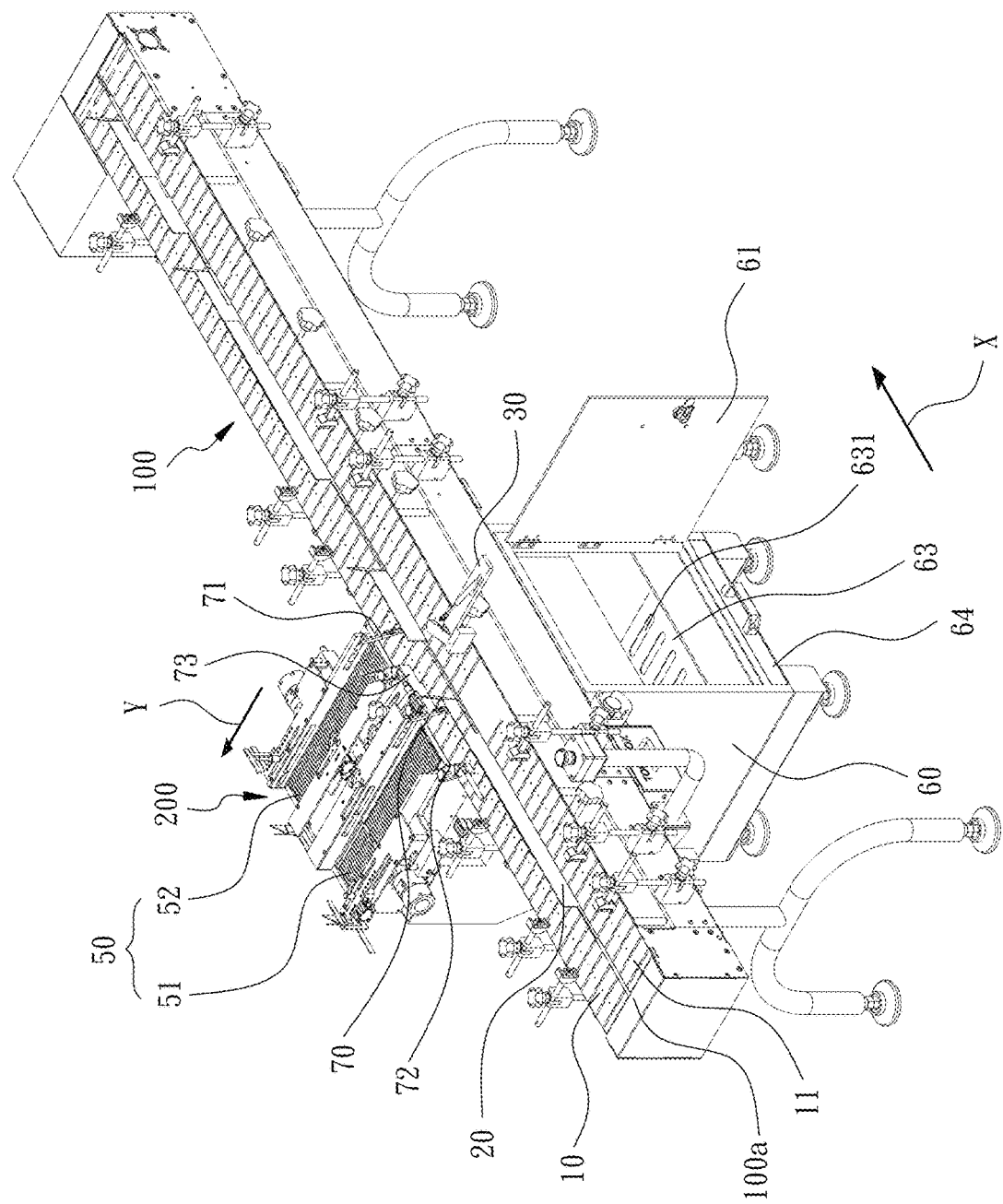
FIG. 2 is another perspective view of the bottle discharging and delivering equipment of counting machine in accordance with an embodiment of the present invention taken from another point of view.

In addition, referring to FIG. 2 and FIG. 7, a bin door 61 is disposed on one end of the collection bin 60, and a receiving port 62 is disposed on another end of the collection bin 60 and arranged below the swinging part 512 to receive the unqualified first bottle 2. The bin door 61 comprises a divider 63 therein. The divider 63 has a plurality of through holes 631 smaller than the size of the first bottle 2. A receiving plate 64 is disposed under the divider 63 and is able to be pulled out of the bin door 61. When the first bottle 2 containing pellet objects falls into the collection bin 60, part of the pellet objects falls onto the divider 63, and part of the pellet objects falls through the through holes 631 onto the receiving plate 64, allowing the user to conveniently collect and recycle the pellet objects.

The bottle discharging device 200 is disposed on one side of the conveyor device 100, which helps reduce the space required by the production line. Meanwhile, each delivering belt of the bottle discharging device 200 swings downward to discharge the bottles, thereby effectively excluding unqualified bottles, so as to reduce the issue of bottle jam caused by excessive operational mechanism and ensure a smoother bottle feeding and discharging operation.

The quantity of the bottle discharging device 200 of the present invention is allowed to be increased according to actual demand, and when combined with two parallel conveyor devices 100, the efficiency of objects filling is improved. Moreover, with the aforementioned structure, adjustment operations according to changes in production specifications are simplified, thereby reducing the time required for adjustments.

By adjusting the position limiting member 41, the distance between the movable fences 20 of the present invention is able to be adjusted according to the size of the bottles, simplifying the adjustment process and reducing the adjustment time.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bottle discharging and delivering equipment of a counting machine, comprising:
    a conveyor device having a first conveyor and a second conveyor disposed in a parallel arrangement, a plurality of movable fences, and an allocation unit; the first conveyor being configured to convey a first bottle along a first direction, and the second conveyor being configured to convey a second bottle along the first direction; the movable fences being orderly disposed between the first conveyor and the second conveyor along the first direction;
    a bottle discharging device disposed on one side of the conveyor device, the bottle discharging device having a delivery belt assembly disposed along a second direction perpendicular to the first direction and a collection bin located below the delivery belt assembly, the delivery belt assembly comprising a first delivery belt and a second delivery belt arranged in a parallel arrangement, each of the first delivery belt and second delivery belt comprises a feeding end and an outputting end, the feeding end being arranged adjacent to the conveyor device and having a fixed part for receiving the first bottle and the second bottle, the outputting end having a swinging part connected with the fixed part, the swinging part swingable between a bottle delivering position and a bottle discharging position with respect to the fixed part;
    wherein one of the movable fences is configured to guide the first bottle toward the first delivering belt; another one of the movable fences and the allocation unit are configured to guide the second bottle toward the second delivering belt;
    wherein the swinging part of both the first delivery belt and the second delivery belt is configured to swing relative to the respective fixed part to discharge a bottle into the collection bin from the respective delivery belt;
    wherein a detection unit of the counting machine determines whether a bottle is qualified or unqualified as being overfilled or underfilled,
    wherein when the detection unit detects the bottle is unqualified, the respective swinging part, comprising the unqualified bottle thereon, swings relative to the respective fixed part to discharge the unqualified bottle into the collection bin from the respective delivery belt,
    wherein when the detection unit detects the bottle is qualified, the qualified bottle is outputted from the outputting end of the respective delivery belt.

2. The bottle discharging and delivering equipment of a counting machine of claim 1, wherein for each delivery belt, the bottle discharging device comprises a swinging seat and a driving member; the swinging seat is disposed on an inner side of the respective swinging part to be wrapped around by one end of the respective delivery belt; the driving member is connected with one end of the swinging seat to drive the swinging seat, so that the respective swinging part swings downward.

3. The bottle discharging and delivering equipment of a counting machine of claim 2, wherein two rollers are disposed on one side of the swinging seat, and a tension wheel is disposed between the two rollers; the respective delivery belt wraps around the two rollers and the tension wheel; the driving member is a swing clamp cylinder.

4. The bottle discharging and delivering equipment of a counting machine of claim 1, wherein the conveyor device comprises a rail seat and a plurality of position limiting members; the rail seat is disposed between the first conveyor and the second conveyor; the rail seat comprises a slide groove in which the movable fences are slidably disposed; the position limiting members rotatably penetrate the rail seat, respectively, and are configured to abut against the corresponding movable fences.

5. The bottle discharging and delivering equipment of a counting machine of claim 1, wherein a channel is arranged between two neighboring movable fences; the allocation unit comprises a fixed seat disposed on one side of the second conveyor, an allocating member pivotally disposed on a front end of the fixed seat, and a driving cylinder connected with the allocating member; the driving cylinder drives the allocating member to sway with respect to the second conveyor, so that the second bottle passes through the channel to move to the corresponding second delivering belt from the second conveyor.

6. The bottle discharging and delivering equipment of a counting machine of claim 5, wherein a tilted first stopper is disposed on the first delivering belt in adjacent to the first conveyor, so as to keep the first bottle to be conveyed to the first delivering belt; a tilted second stopper is disposed on the second delivering belt in adjacent to the first conveyor, so as to keep the second bottle to be conveyed to the second delivering belt.

7. The bottle discharging and delivering equipment of a counting machine of claim 1, wherein the collection bin comprises a bin door on one end thereof, and a receiving port on another end thereof and arranged below the swinging part to receive the unqualified bottle.

8. The bottle discharging and delivering equipment of a counting machine of claim 7, wherein the bin door comprises a divider therein; the divider has a plurality of through holes whose size are smaller than a size of the bottle; a receiving plate is disposed under the divider and is able to be pulled out of the bin door.

* * * * *